US009175968B2

(12) United States Patent
Haleem (10) Patent No.: US 9,175,968 B2
(45) Date of Patent: Nov. 3, 2015

(54) NAVIGATION SYSTEM WITH LOCATION REPORT AND METHOD OF OPERATION THEREOF

(75) Inventor: Ambreen Haleem, Sunnyvale, CA (US)

(73) Assignee: TELENAV, INC, Sunnyvale, CA (US)

(*) Notice: Subject to any disclaimer, the term of this patent is extended or adjusted under 35 U.S.C. 154(b) by 971 days.

(21) Appl. No.: 12/709,446

(22) Filed: Feb. 19, 2010

(65) Prior Publication Data
US 2011/0208423 A1    Aug. 25, 2011

(51) Int. Cl.
*G01C 21/00* (2006.01)
*G01C 21/34* (2006.01)

(52) U.S. Cl.
CPC ..................... *G01C 21/343* (2013.01)

(58) Field of Classification Search
CPC  G06Q 10/08; G06Q 10/0631; G06Q 30/0261
USPC ........................ 701/408, 428, 532, 533; 705/6
See application file for complete search history.

(56) References Cited

U.S. PATENT DOCUMENTS

| | | |
|---|---|---|
| 2003/0055689 A1 | 3/2003 | Block et al. |
| 2004/0006548 A1* | 1/2004 | Mahmood ..................... 707/1 |
| 2006/0173616 A1* | 8/2006 | Kugumiya et al. ........... 701/211 |
| 2007/0188319 A1* | 8/2007 | Upton ..................... 340/539.13 |
| 2008/0046298 A1* | 2/2008 | Ben-Yehuda et al. ............ 705/6 |
| 2009/0143977 A1 | 6/2009 | Beletski et al. |

OTHER PUBLICATIONS

International Search Report for Application No. PCT/US2011/024454 dated Apr. 11, 2011.

* cited by examiner

*Primary Examiner* — John Q Nguyen
*Assistant Examiner* — Rodney P King
(74) *Attorney, Agent, or Firm* — IP Investment Law Group (57) ABSTRACT

A method of operation of a navigation system includes: providing a project plan; creating a travel plan having a travel location based on the project plan; navigating to the travel location; and generating a notification at the travel location for displaying on a device.

20 Claims, 6 Drawing Sheets

NAVIGATION SYSTEM WITH LOCATION REPORT AND METHOD OF OPERATION THEREOF

TECHNICAL FIELD

The present invention relates generally to a navigation system, and more particularly to a system for a navigation system with location report.

BACKGROUND ART

Modern portable consumer and industrial electronics provide increasing levels of functionality to support modern life including location-based services. This is especially true for client devices such as navigation systems, cellular phones, portable digital assistants, and multifunction devices.

The navigation systems generally provide a recommended route from a starting point to a desired destination. Generally, the starting point and the desired destination are selected from a large database of roads stored in a mass media storage, such as a compact disc read-only memory (CD ROM) or a hard drive, which includes roads of an area to be travelled by a user. The navigation systems can be located in a personal computer or it can be installed in a vehicle.

As users adopt mobile location-based service devices, new and old usage begin to take advantage of this new device space. Navigation system and service providers are continually making improvement in the user's experience in order to be competitive.

Thus, a need still remains for a navigation system with location-based service mechanism for increasing levels of functionality. In view of ease of use, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: providing a project plan; creating a travel plan having a travel location based on the project plan; navigating to the travel location; and generating a notification at the travel location for displaying on a device.

The present invention provides a navigation system, including: a storage unit for providing a project plan, the project plan stored and accessed in the storage unit; a control unit, coupled to the storage unit, for creating a travel plan having a travel location based on the project plan; a location unit, coupled to the control unit, for navigating to the travel location; and a user interface, coupled to the location unit, for generating a notification at the travel location for displaying on a device.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element comprising a speed component and a heading component.

The term "relevant information" referred to herein comprises the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Figure 1:
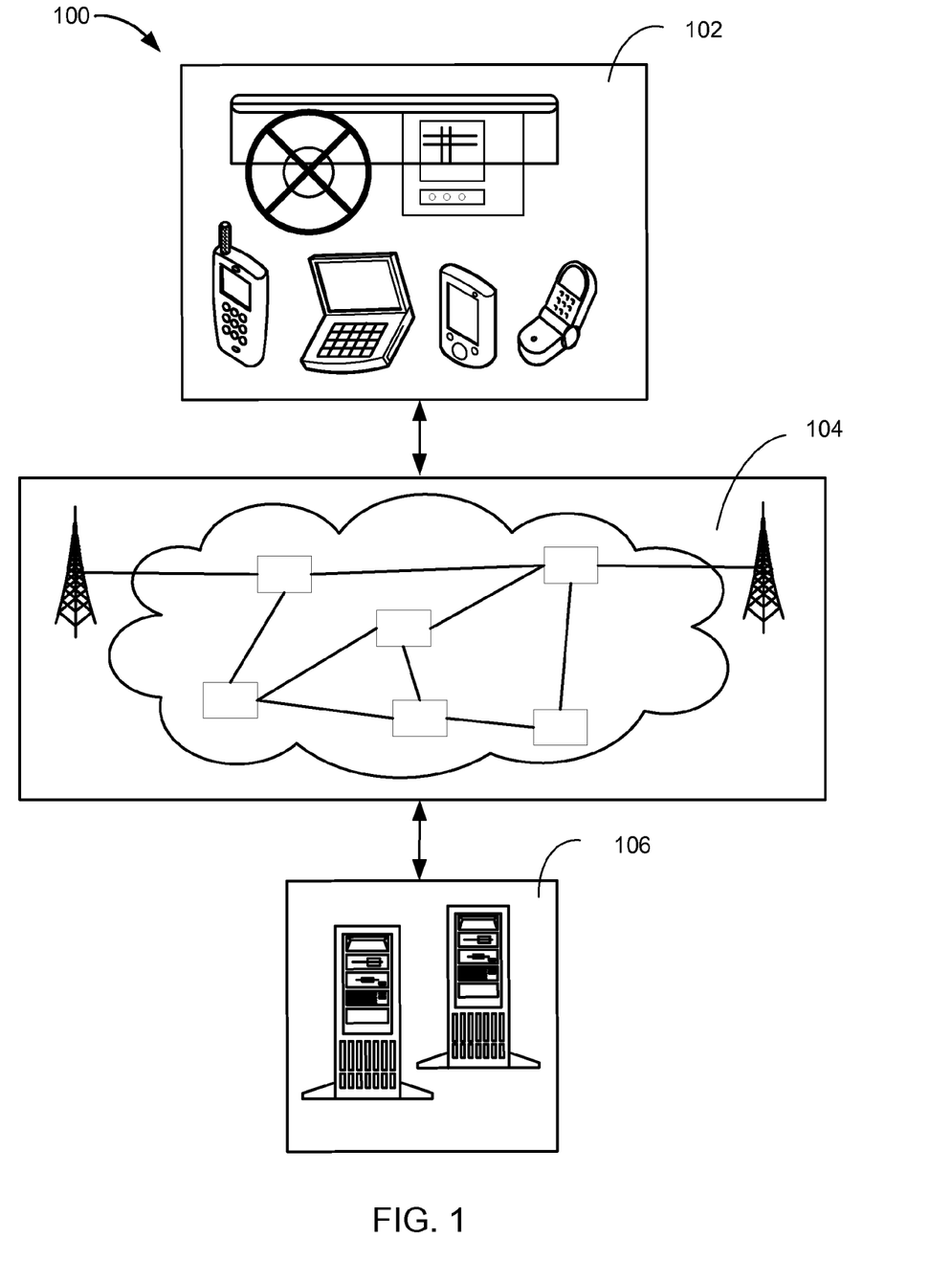
FIG. 1 is a navigation system with notification mechanism in a first embodiment of the present invention.

Referring now to FIG. 1, therein is shown a navigation system 100 with notification mechanism in a first embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102.

In another example, the first device 102 can be a particularized machine, such as a mainframe, a server, a cluster server, rack mounted server, or a blade server, or as more specific examples, an IBM System z10™ Business Class mainframe or a HP ProLiant ML™ server. Yet another example, the second device 106 can be a particularized machine, such as a portable computing device, a thin client, a notebook, a netbook, a smartphone, personal digital assistant, or a cellular phone, and as specific examples, an Apple iPhone™, Palm Centro™, or Moto Q Global™.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
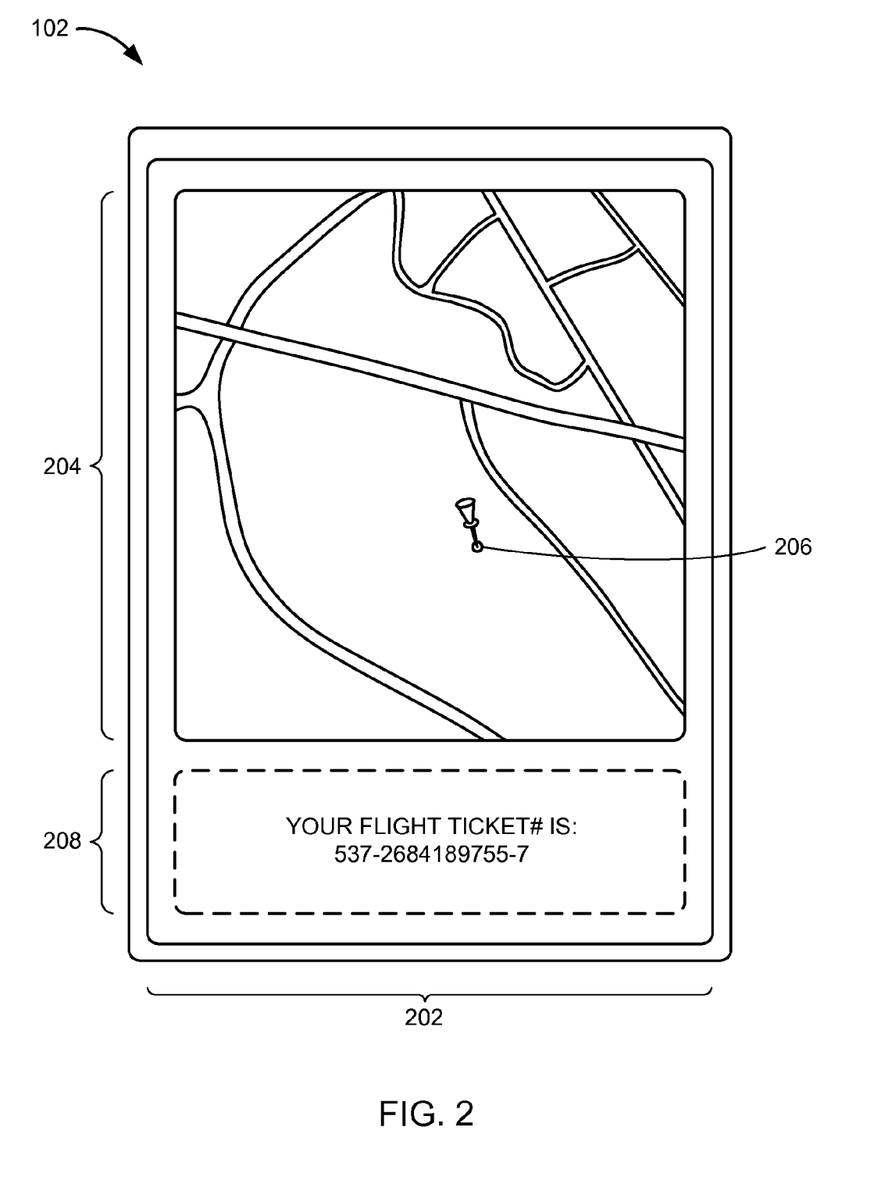
FIG. 2 is a display interface of the first device.

Referring now to FIG. 2, therein is shown a display interface 202 of the first device 102. The display interface 202 can include a display, a projector, a video screen, a speaker, or any combination thereof.

The display interface 202 can include a navigation map 204, which can include a visual presentation of an area. The navigation map 204 can also include a current location 206, which can include a present position of the first device 102.

The display interface 202 can include a notification 208. The notification 208 can include information that is reported or presented by the navigation system 100 of FIG. 1.

The notification 208 can be determined based on the current location 206. For example, the notification 208 is shown as "YOUR FLIGHT TICKET# IS: 537-2684189755-7" to provide flight information when the current location 206 is at an airport.

The notification 208 is shown in a textual representation, although it is understood that the notification 208 can be presented with any visual, audible, or mechanical means. For example, the notification 208 can be presented with text, images, audio, video, graphics, vibration, or a combination thereof.

Figure 3:
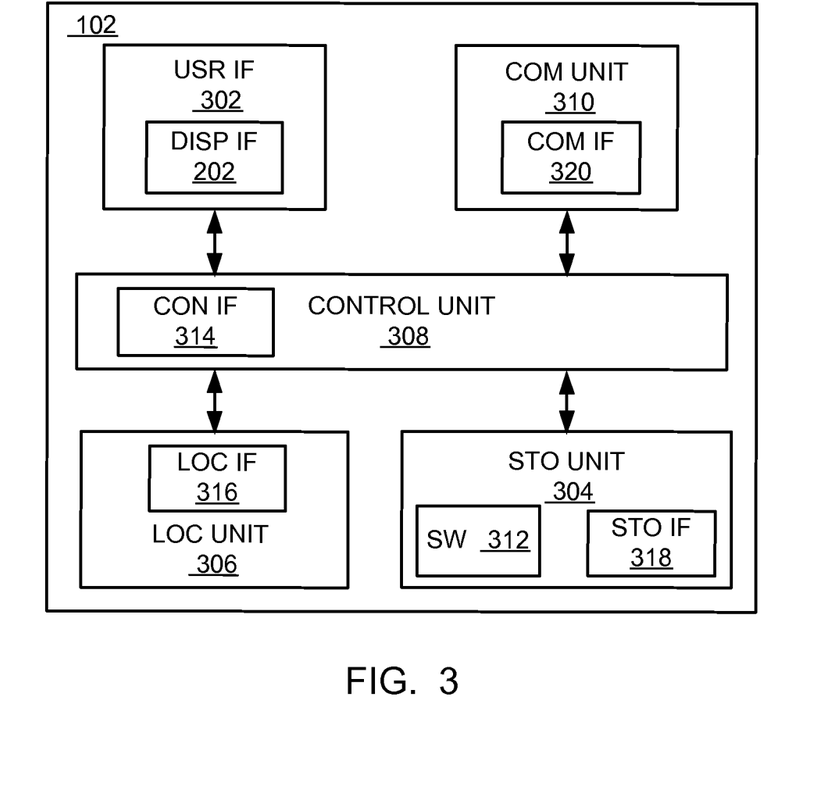
FIG. 3 is an exemplary block diagram of the first device.

Referring now to FIG. 3, therein is shown an exemplary block diagram of the first device 102. The first device 102 can include a user interface 302, a storage unit 304, a location unit 306, a control unit 308, and a communication unit 310.

The user interface 302 allows a user (not shown) to interface and interact with the first device 102. The user interface 302 can include an input device and an output device. Examples of the input device of the user interface 302 can include a keypad, a touchpad, soft-keys, a keyboard, a microphone, or any combination thereof to provide data and communication inputs. Examples of the output device of the user interface 302 can include the display interface 202. The display interface 202 can include a display, a projector, a video screen, a speaker, or any combination thereof.

The control unit 308 can execute a software 312 to provide the intelligence of the navigation system 100. The control unit 308 can operate the user interface 302 to display information generated by the navigation system 100. The control unit 308 can also execute the software 312 for the other functions of the navigation system 100, including receiving location information from the location unit 306. The control unit 308 can further execute the software 312 for interaction with the communication path 104 of FIG. 1 via the communication unit 310.

The control unit 308 can be implemented in a number of different manners. For example, the control unit 308 can be a processor, an embedded processor, a microprocessor, a hardware control logic, a hardware finite state machine (FSM), a digital signal processor (DSP), or a combination thereof.

The control unit 308 can include a controller interface 314. The controller interface 314 can be used for communication between the control unit 308 and other functional units in the first device 102. The controller interface 314 can also be used for communication that is external to the first device 102.

The controller interface 314 can receive information from the other functional units or from external sources, or can transmit information to the other functional units or to external destinations. The external sources and the external destinations refer to sources and destinations external to the first device 102.

The controller interface 314 can be implemented in different ways and can include different implementations depending on which functional units or external units are being interfaced with the controller interface 314. For example, the controller interface 314 can be implemented with a pressure sensor, an inertial sensor, a microelectromechanical system (MEMS), optical circuitry, waveguides, wireless circuitry, wireline circuitry, or a combination thereof.

The location unit 306 can generate location information, current heading, and current speed of the first device 102, as examples. The location unit 306 can be implemented in many ways. For example, the location unit 306 can function as at least a part of a global positioning system (GPS), an inertial navigation system, a cellular-tower location system, a pressure location system, or any combination thereof.

The location unit 306 can include a location interface 316. The location interface 316 can be used for communication between the location unit 306 and other functional units in the first device 102. The location interface 316 can also be used for communication that is external to the first device 102.

The location interface 316 can receive information from the other functional units or from external sources, or can transmit information to the other functional units or to external destinations. The external sources and the external destinations refer to sources and destinations external to the first device 102.

The location interface 316 can include different implementations depending on which functional units or external units are being interfaced with the location unit 306. The location interface 316 can be implemented with technologies and techniques similar to the implementation of the controller interface 314.

The storage unit 304 can store the software 312. The storage unit 304 can also store the relevant information, such as advertisements, points of interest (POI), navigation routing entries, or any combination thereof.

The storage unit 304 can be a volatile memory, a nonvolatile memory, an internal memory, an external memory, or a combination thereof. For example, the storage unit 304 can be a nonvolatile storage such as non-volatile random access memory (NVRAM), Flash memory, disk storage, or a volatile storage such as static random access memory (SRAM).

The storage unit 304 can include a storage interface 318. The storage interface 318 can be used for communication between the location unit 306 and other functional units in the first device 102. The storage interface 318 can also be used for communication that is external to the first device 102.

The storage interface 318 can receive information from the other functional units or from external sources, or can transmit information to the other functional units or to external destinations. The external sources and the external destinations refer to sources and destinations external to the first device 102.

The storage interface 318 can include different implementations depending on which functional units or external units are being interfaced with the storage unit 304. The storage interface 318 can be implemented with technologies and techniques similar to the implementation of the controller interface 314.

The communication unit 310 can enable external communication to and from the first device 102. For example, the communication unit 310 can permit the first device 102 to communicate with the second device 106 of FIG. 1, an attachment, such as a peripheral device or a computer desktop, and the communication path 104.

The communication unit 310 can also function as a communication hub allowing the first device 102 to function as part of the communication path 104 and not limited to be an end point or terminal unit to the communication path 104. The communication unit 310 can include active and passive components, such as microelectronics or an antenna, for interaction with the communication path 104.

The communication unit 310 can include a communication interface 320. The communication interface 320 can be used for communication between the communication unit 310 and other functional units in the first device 102. The communication interface 320 can receive information from the other functional units or can transmit information to the other functional units.

The communication interface 320 can include different implementations depending on which functional units are being interfaced with the communication unit 310. The communication interface 320 can be implemented with technologies and techniques similar to the implementation of the controller interface 314.

For illustrative purposes, the navigation system 100 is shown with the partition having the user interface 302, the storage unit 304, the location unit 306, the control unit 308, and the communication unit 310 although it is understood that the navigation system 100 can have a different partition. For example, the software 312 can be partitioned differently such that some or all of its function can be in the control unit 308, the location unit 306, and the communication unit 310. Also, the first device 102 can include other functional units not shown in FIG. 3 for clarity.

The functional units in the first device 102 can work individually and independently of the other functional units. The first device 102 can work individually and independently from the second device 106 and the communication path 104.

Figure 4:
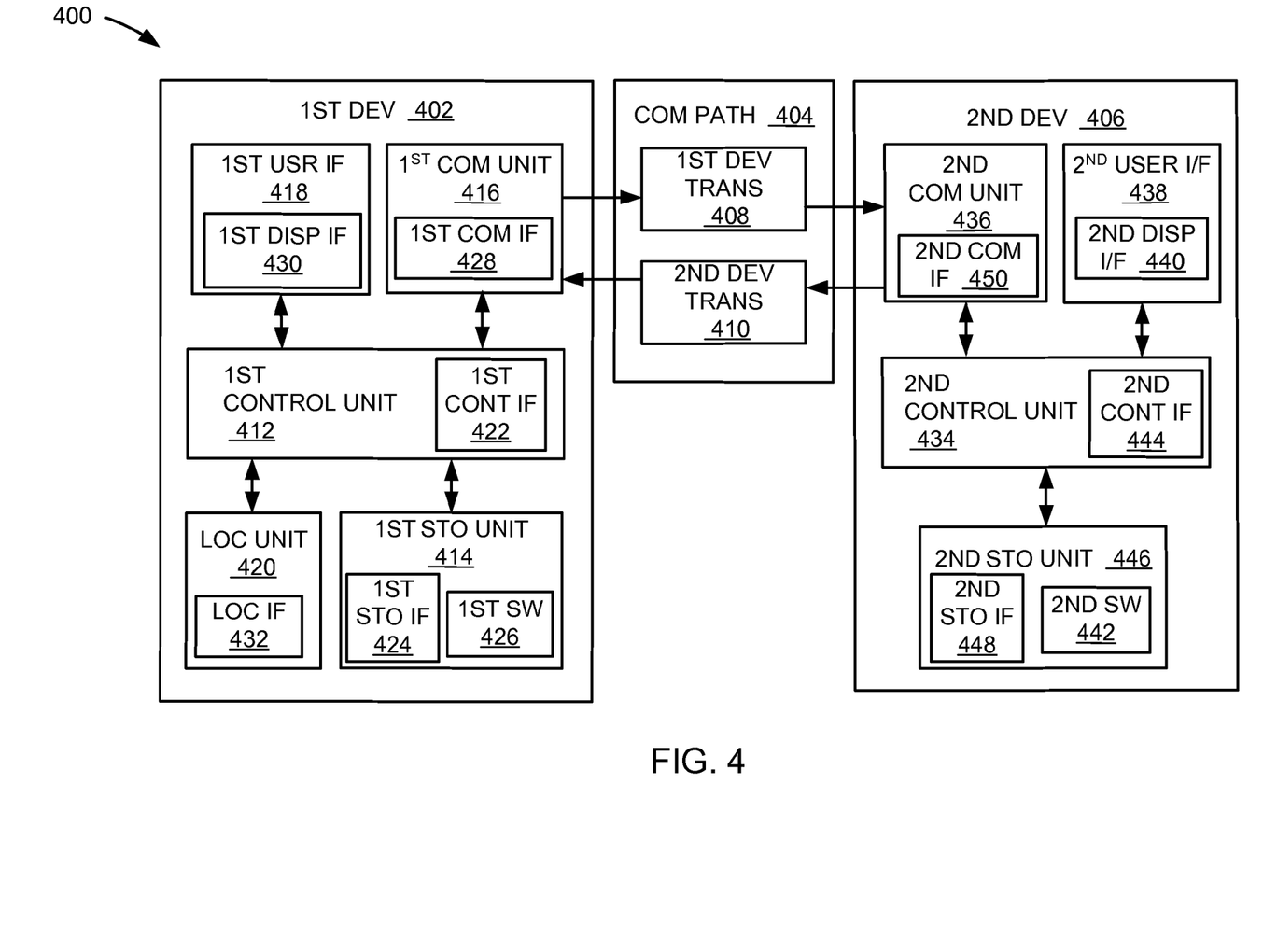
FIG. 4 is an exemplary block diagram of a navigation system with notification mechanism in a second embodiment of the present invention.

Referring now to FIG. 4, therein is shown an exemplary block diagram of a navigation system 400 with notification mechanism in a second embodiment of the present invention. The navigation system 400 can include a first device 402, a communication path 404, and a second device 406.

The first device 402 can communicate with the second device 406 over the communication path 404. For example, the first device 402, the communication path 404, and the second device 406 can be the first device 102 of FIG. 1, the communication path 104 of FIG. 1, and the second device 106 of FIG. 1, respectively. The screen shot shown on the display interface 202 described in FIG. 2 can represent the screen shot for the navigation system 400.

The first device 402 can send information in a first device transmission 408 over the communication path 404 to the second device 406. The second device 406 can send information in a second device transmission 410 over the communication path 404 to the first device 402.

For illustrative purposes, the navigation system 400 is shown with the first device 402 as a client device, although it is understood that the navigation system 400 can have the first device 402 as a different type of device. For example, the first device 402 can be a server.

Also for illustrative purposes, the navigation system 400 is shown with the second device 406 as a server, although it is understood that the navigation system 400 can have the second device 406 as a different type of device. For example, the second device 406 can be a client device.

For brevity of description in this embodiment of the present invention, the first device 402 will be described as a client device and the second device 406 will be described as a server device. The present invention is not limited to this selection for the type of devices. The selection is an example of the present invention.

The first device 402 can include a first control unit 412, a first storage unit 414, a first communication unit 416, a first user interface 418, and a location unit 420. The first device 402 can be similarly described by the first device 102.

The first control unit 412 can include a first controller interface 422. The first control unit 412 and the first controller interface 422 can be similarly described as the control unit 308 of FIG. 3 and the controller interface 314 of FIG. 3, respectively.

The first storage unit 414 can include a first storage interface 424. The first storage unit 414 and the first storage interface 424 can be similarly described as the storage unit 304 of FIG. 3 and the storage interface 318 of FIG. 3, respectively. A first software 426 can be stored in the first storage unit 414.

The first communication unit 416 can include a first communication interface 428. The first communication unit 416 and the first communication interface 428 can be similarly described as the communication unit 310 of FIG. 3 and the communication interface 320 of FIG. 3, respectively.

The first user interface 418 can include a first display interface 430. The first user interface 418 and the first display interface 430 can be similarly described as the user interface 302 of FIG. 3 and the display interface 202 of FIG. 3, respectively.

The location unit 420 can include a location interface 432. The location unit 420 and the location interface 432 can be similarly described as the location unit 306 of FIG. 3 and the location interface 316 of FIG. 3, respectively.

The performance, architectures, and type of technologies can also differ between the first device 102 and the first device 402. For example, the first device 102 can function as a single device embodiment of the present invention and can have a higher performance than the first device 402. The first device 402 can be similarly optimized for a multiple device embodiment of the present invention.

For example, the first device 102 can have a higher performance with increased processing power in the control unit 308 compared to the first control unit 412. The storage unit 304 can provide higher storage capacity and access time compared to the first storage unit 414.

Also for example, the first device 402 can be optimized to provide increased communication performance in the first communication unit 416 compared to the communication unit 310. The first storage unit 414 can be sized smaller compared to the storage unit 304. The first software 426 can be smaller than the software 312 of FIG. 3.

The second device 406 can be optimized for implementing the present invention in a multiple device embodiment with the first device 402. The second device 406 can provide the additional or higher performance processing power compared to the first device 402. The second device 406 can include a second control unit 434, a second communication unit 436, and a second user interface 438.

The second user interface 438 allows a user (not shown) to interface and interact with the second device 406. The second user interface 438 can include an input device and an output device. Examples of the input device of the second user interface 438 can include a keypad, a touchpad, soft-keys, a keyboard, a microphone, or any combination thereof to provide data and communication inputs. Examples of the output device of the second user interface 438 can include a second display interface 440. The second display interface 440 can include a display, a projector, a video screen, a speaker, or any combination thereof.

The second control unit 434 can execute a second software 442 to provide the intelligence of the second device 106 of the navigation system 400. The second software 442 can operate in conjunction with the first software 426. The second control unit 434 can provide additional performance compared to the first control unit 412 or the control unit 308.

The second control unit 434 can operate the second user interface 438 to display information. The second control unit 434 can also execute the second software 442 for the other functions of the navigation system 400, including operating the second communication unit 436 to communicate with the first device 402 over the communication path 404.

The second control unit 434 can be implemented in a number of different manners. For example, the second control unit 434 can be a processor, an embedded processor, a microprocessor, a hardware control logic, a hardware finite state machine (FSM), a digital signal processor (DSP), or a combination thereof.

The second control unit 434 can include a second controller interface 444. The second controller interface 444 can be used for communication between the second control unit 434 and other functional units in the second device 406. The second controller interface 444 can also be used for communication that is external to the second device 406.

The second controller interface 444 can receive information from the other functional units or from external sources, or can transmit information to the other functional units or to external destinations. The external sources and the external destinations refer to sources and destinations external to the second device 406.

The second controller interface 444 can be implemented in different ways and can include different implementations depending on which functional units or external units are being interfaced with the second controller interface 444. For example, the second controller interface 444 can be implemented with a pressure sensor, an inertial sensor, a microelectromechanical system (MEMS), optical circuitry, waveguides, wireless circuitry, wireline circuitry, or a combination thereof.

A second storage unit 446 can store the second software 442. The second storage unit 446 can also store the relevant information, such as advertisements, points of interest (POI), navigation routing entries, or any combination thereof. The second storage unit 446 can be sized to provide the additional storage capacity to supplement the first storage unit 414.

For illustrative purposes, the second storage unit 446 is shown as a single element, although it is understood that the second storage unit 446 can be a distribution of storage elements. Also for illustrative purposes, the navigation system 400 is shown with the second storage unit 446 as a single hierarchy storage system, although it is understood that the navigation system 400 can have the second storage unit 446 in a different configuration. For example, the second storage unit 446 can be formed with different storage technologies forming a memory hierarchal system including different levels of caching, main memory, rotating media, or off-line storage.

The second storage unit 446 can be a volatile memory, a nonvolatile memory, an internal memory, an external memory, or a combination thereof. For example, the second storage unit 446 can be a nonvolatile storage such as nonvolatile random access memory (NVRAM), Flash memory, disk storage, or a volatile storage such as static random access memory (SRAM).

The second storage unit 446 can include a second storage interface 448. The second storage interface 448 can be used for communication between the location unit 306 and other functional units in the second device 406. The second storage interface 448 can also be used for communication that is external to the second device 406.

The second storage interface 448 can receive information from the other functional units or from external sources, or can transmit information to the other functional units or to external destinations. The external sources and the external destinations refer to sources and destinations external to the second device 406.

The second storage interface 448 can include different implementations depending on which functional units or external units are being interfaced with the second storage unit 446. The second storage interface 448 can be implemented with technologies and techniques similar to the implementation of the second controller interface 444.

The second communication unit 436 can enable external communication to and from the second device 406. For example, the second communication unit 436 can permit the second device 406 to communicate with the first device 402 over the communication path 404.

The second communication unit 436 can also function as a communication hub allowing the second device 406 to function as part of the communication path 404 and not limited to be an end point or terminal unit to the communication path 404. The second communication unit 436 can include active and passive components, such as microelectronics or an antenna, for interaction with the communication path 404.

The second communication unit 436 can include a second communication interface 450. The second communication interface 450 can be used for communication between the second communication unit 436 and other functional units in the second device 406. The second communication interface 450 can receive information from the other functional units or can transmit information to the other functional units.

The second communication interface 450 can include different implementations depending on which functional units are being interfaced with the second communication unit 436. The second communication interface 450 can be implemented with technologies and techniques similar to the implementation of the second controller interface 444.

The first communication unit 416 can couple with the communication path 404 to send information to the second device 406 in the first device transmission 408. The second device 406 can receive information in the second communication unit 436 from the first device transmission 408 of the communication path 404.

The second communication unit 436 can couple with the communication path 404 to send information to the first device 402 in the second device transmission 410. The first device 402 can receive information in the first communication unit 416 from the second device transmission 410 of the communication path 404. The navigation system 400 can be executed by the first control unit 412, the second control unit 434, or a combination thereof.

For illustrative purposes, the second device 106 is shown with the partition having the second user interface 438, the second storage unit 446, the second control unit 434, and the second communication unit 436, although it is understood that the second device 106 can have a different partition. For example, the second software 442 can be partitioned differently such that some or all of its function can be in the second control unit 434 and the second communication unit 436. Also, the second device 406 can include other functional units not shown in FIG. 4 for clarity.

The functional units in the first device 402 can work individually and independently of the other functional units. The first device 402 can work individually and independently from the second device 406 and the communication path 404.

The functional units in the second device 406 can work individually and independently of the other functional units. The second device 406 can work individually and independently from the first device 402 and the communication path 404.

For illustrative purposes, the navigation system 400 is described by operation of the first device 402 and the second device 406. It is understood that the first device 402 and the second device 406 can operate any of the modules and functions of the navigation system 400. For example, the first device 402 is described to operate the location unit 420, although it is understood that the second device 406 can also operate the location unit 420.

Figure 5:
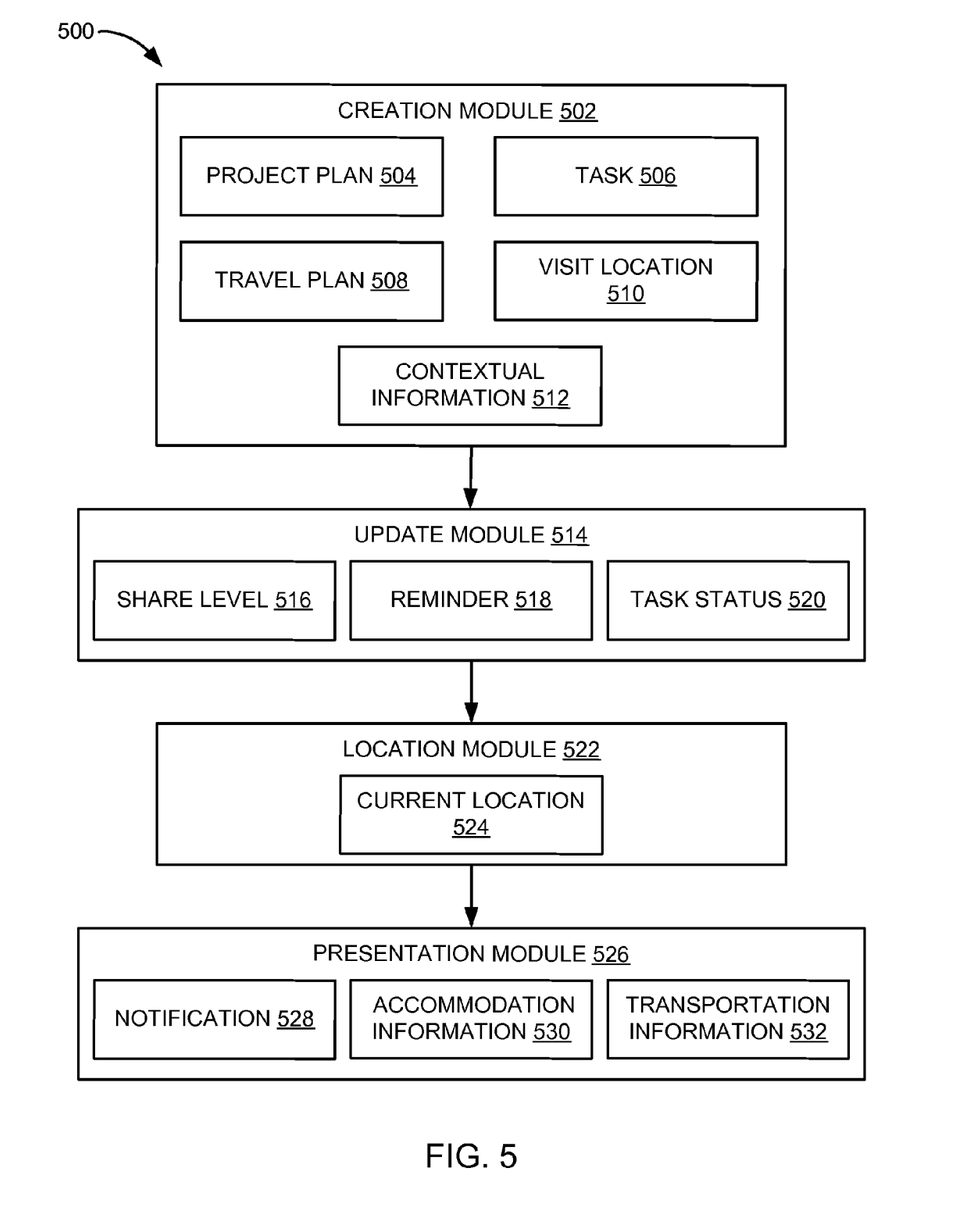
FIG. 5 is a navigation system with notification mechanism in a third embodiment of the present invention.

Referring now to FIG. 5, therein is shown a navigation system 500 with notification mechanism in a third embodiment of the present invention. The navigation system 500 can be represented by a system that includes supports for project management or travel management. The navigation system 500 can include a system having location awareness, contextual awareness, or a combination thereof.

The navigation system 500 can include a creation module 502 to create or organize a project plan 504, which can include a list or series of items to be done. For example, the items can include a task 506, which can include an action to be taken, a step to be carried out, or a goal to be accomplished.

The project plan 504 can be provided to include a schedule so that the task 506 can be executed at a specified time. The project plan 504 can include a resource allocated to perform the task 506.

The creation module 502 can be provided to create a travel plan 508, which can include an itinerary, a planned route, or a summary of a trip. The travel plan 508 can be created based on the project plan 504.

The travel plan 508 can be created to include scheduled times of departure or arrival at a travel location 510, which can include a route point, a waypoint, or a destination, in or along the planned route. The project plan 504 or the travel plan 508 can be stored and accessed in the first storage unit 414 of FIG. 4, the second storage unit 446 of FIG. 4, or a combination thereof.

The travel location 510 can include a region that is predetermined based on the project plan 504 or the travel plan 508. The travel location 510 can be defined based on a geofence, a perimeter, or a boundary of a geographical area having a radius or a distance from a point, a location, or a work site that is specified in the project plan 504 or the travel plan 508.

The creation module 502 can include an extension interface or a computer program that provides interaction with a host application, which can include a project management tool or a program that operates on a device, a host, or a remote machine, to perform a specific function. For example, the extension interface can include a plugin, an addon, or a snapin.

The project plan 504 or the travel plan 508 can be combined with or linked to the host application. As an example, the project management tool can include a computer program, a software, or a procedure that can be used to create the project plan 504.

The project plan 504 or the travel plan 508 can be created, compiled, or linked with the first software 426 of FIG. 4 or the second software 442 of FIG. 4. For example, the project plan 504 can be created and sent from the second device 406 of FIG. 4 to the first device 402 of FIG. 4. Also for example, the project plan 504 can be created and sent from the first device 402 to the second device 406.

Information from the project plan 504 or the travel plan 508 can be combined or synced with the host application by the creation module 502. The task 506 can be associated with the travel location 510. For example, the task 506 is scheduled to be performed or executed at the travel location 510.

The creation module 502 can collect contextual information 512 or data that is related to the project plan 504 or the travel plan 508. The contextual information 512 can be extracted from emails, messages, documents, files, web sites, or any other means of obtaining information. The contextual information 512 can be extracted based on terms, words, phrases, or expressions in the project plan 504 or the travel plan 508.

As an example, the contextual information 512 can include contact information related to a resource name assigned in the project plan 504. The resource name can be a person who the user is scheduled to meet at the travel location 510. The contact information can include an email address, a telephone number, a property address, and a name of an entity, such as a person, a company, or a location.

As another example, the contextual information 512 can include preparation information about what to plan before the task 506 is performed at the travel location 510. For example, the task 506 can be a design review, and the preparation information can include information about a meeting agenda, documents to share, or slides to present to team members.

For example, the contact information can be pushed, saved, or merged with a user contact list by the creation module 502, without having a user skimming, surfing, or searching through emails or messages to save time. Also for example, a corporate address book can be automatically filled with the contact information that can be useful or needed by the user.

The creation module 502 can be implemented with the navigation system 400 of FIG. 4. For example, the creation module 502 can be implemented with the first control unit 412 of FIG. 4, the first storage unit 414 of FIG. 4, the first communication unit 416 of FIG. 4, the first user interface 418 of FIG. 4, the second control unit 434 of FIG. 4, the second communication unit 436 of FIG. 4, the second user interface 438 of FIG. 4, the second storage unit 446 of FIG. 4, or a combination thereof.

The navigation system 500 can include an update module 514 to supply or add additional information to the project plan 504 or the travel plan 508. For example, the additional information includes more tasks added to the project plan 504. The update module 514 can be coupled to or communicated with the creation module 502.

As an example, an employee at a company or a user can edit the project plan 504 on a desktop environment with the extension interface or directly on the first device 402. Also for example, the employee or the user can control or configure that the task 506 or a portion of the project plan 504 can be communicated to or shared with the second device 406.

The update module 514 can include a capability to choose or select a setting of a share level 516, which can indicate a sensitivity level of information, for the project plan 504 or the travel plan 508. For example, a user can select a reminder 518 for the task 506 or add a note to the project plan 504 and select "personal" as an option for the share level 516 to indicate that the reminder 518 or the note is used just by the user. The reminder 518 can include a message that can be presented at a preset time to help the user remember to perform a specified action.

The update module 514 can provide a capability to record a task status 520 for the task 506 in the project plan 504. The task status 520 can be recorded at the travel location 510. For example, the user can add the task status 520 as an update to the project plan 504 and select "shared" as another option for the share level 516 to indicate that the task status 520 can be shared with team members of a project. Also for example, the task status 520 can be made available to or accessed by a manager or any authorized person via the extension interface that is linked to the project management tool.

The update module 514 can be implemented with the navigation system 400 of FIG. 4. For example, the update module 514 can be implemented with the first control unit 412 of FIG. 4, the first storage unit 414 of FIG. 4, the first communication unit 416 of FIG. 4, the first user interface 418 of FIG. 4, the second control unit 434 of FIG. 4, the second communication unit 436 of FIG. 4, the second user interface 438 of FIG. 4, the second storage unit 446 of FIG. 4, or a combination thereof.

The navigation system 500 can include a location module 522 to obtain location information or calculate a current location 524, which can include a present position, of a device. The location module 522 can be coupled to or communicated with the update module 514. The location module 522 can generate navigation instructions or directions, providing guidance to navigate to the travel location 510 for the task 506 to be executed.

The location module 522 can compare the current location 524 to the travel location 510. A result of the comparison can be provided by the location module 522 to other modules for further processing. For example, the task 506 can be executed at the current location 524 according to the project plan 504 if the current location 524 is the travel location 510.

Besides adding the task status 520 to the project plan 504 for purposes of determining if the task 506 is completed or in progress, the update module 514 can keep the project plan 504 or the travel plan 508 updated based on location awareness. For example, the project plan 504 or the travel plan 508 can be updated based on the travel location 510 or the current location 524 of a mobile user (e.g. a user of the first device 402).

Someone else (e.g. a user of another of the first device 402 or the second device 406) can open the project plan 504 or the travel plan 508 and see or get a status of the mobile user. For example, the status can indicate that the mobile user is at an airport or already checked into a hotel.

The location module 522 can be implemented with the navigation system 400 of FIG. 4. For example, the location module 522 can be implemented with the first control unit 412 of FIG. 4, the first storage unit 414 of FIG. 4, the first communication unit 416 of FIG. 4, the first user interface 418 of FIG. 4, the location unit 420 of FIG. 4, the second control unit 434 of FIG. 4, the second communication unit 436 of FIG. 4, the second user interface 438 of FIG. 4, the second storage unit 446 of FIG. 4, or a combination thereof.

The navigation system 500 can include a presentation module 526 to generate a notification 528, which can include an alert, a warning, or an informational message. The notification 528 can be represented by the notification 208 of FIG. 2.

For example, the notification 528 can be presented on the first device 402 or the second device 406.

The presentation module 526 can present or display the notification 528 based on location awareness. For example, the notification 528 can be generated or displayed at the current location 524 when the location module 522 indicates that the current location 524 is the travel location 510.

The notification 528 can include accommodation information 530, which can include locations for travelers. The accommodation information 530 can be presented upon arrival at the travel location 510.

For example, the accommodation information 530 can be related to lodging or nourishment. Also for example, the accommodation information 530 can include a hotel address or information about a hotel upon arrival at the destination.

The notification 528 can include transportation information 532, which can include locations or information related to taking or moving someone or something from one location to another. For example, the transportation information 532 can include information about car rentals or taxicabs. The transportation information 532 can be communicated or presented at the travel location 510.

The notification 528 can include the contextual information 512. For example, upon arrival at the destination, the contextual information 512 can include a name of the person who the user is going to meet or work with to perform the task 506 according to the project plan 504.

The notification 528 can include information that can be useful or important to the user. For example, if an employee has been scheduled to travel, he/she can get the notification 528 when the travel plan 508 is completed. Also for example, as the user enters an airport, the notification 528 can include flight information or a ticket number.

The notification 528 can include the reminder 518. For example, the notification 528 can be presented to remind or inform the user about an airline name as indicated by the travel plan 508. Also for example, when the user is at an airport check-in counter, the notification 528 can be automatically presented with a flight confirmation number.

The presentation module 526 can present the notification 528 with information related to the project plan 504 or the travel plan 508. The update module 514 can instruct the presentation module 526 to present the notification 528. For example, the presentation module 526 can be instructed to automatically broadcast the notification 528 for the task 506 or with any project related messages on the first device 402 or the second device 406.

The notification 528 can be presented with real-time information from the update module 514. For example, the real-time information can be presented as the task status 520 is available. Also for example, the notification 528 can be presented in a chart or any illustration process that can be viewed by the user with minimum effort or manual work.

The presentation module 526 can be implemented with the navigation system 400 of FIG. 4. For example, the presentation module 526 can be implemented with the first control unit 412 of FIG. 4, the first storage unit 414 of FIG. 4, the first communication unit 416 of FIG. 4, the first user interface 418 of FIG. 4, the second control unit 434 of FIG. 4, the second communication unit 436 of FIG. 4, the second user interface 438 of FIG. 4, the second storage unit 446 of FIG. 4, or a combination thereof.

It has been discovered that the notification 528 presented based on the current location 524 is completely automated and presented as the task status 520 is available, effectively allowing immediate actions to occur in response to the task status 520.

It has also been discovered that the notification 528 presented with the contextual information 512 greatly reduces time that would otherwise be required to manually gather or search for information, requiring less user interaction.

The physical transformation of data of the project plan 504, the travel plan 508, and the contextual information 512 to the current location 524 and the notification 528 results in movement in the physical world, such as people using the first device 402 of FIG. 4, the second device 406 of FIG. 4, or vehicles, based on the operation of the navigation system 500. As the movement in the physical world occurs, the movement itself creates additional information that is converted back to the data for further processing with the project plan 504, the travel plan 508, and the contextual information 512 for the continued operation of the navigation system 500 and to continue the movement in the physical world.

Thus, it has been discovered that the navigation system 500 of the present invention furnishes important and heretofore unknown and unavailable solutions, capabilities, and functional aspects for providing an effective and efficient communication.

The navigation system 500 describes the module functions or order as an example. The modules can be partitioned differently. For example, the creation module 502 is shown as a single module, although the creation module 502 can be implemented in multiple modules. Each of the modules can operate individually and independently of the other modules.

Figure 6:
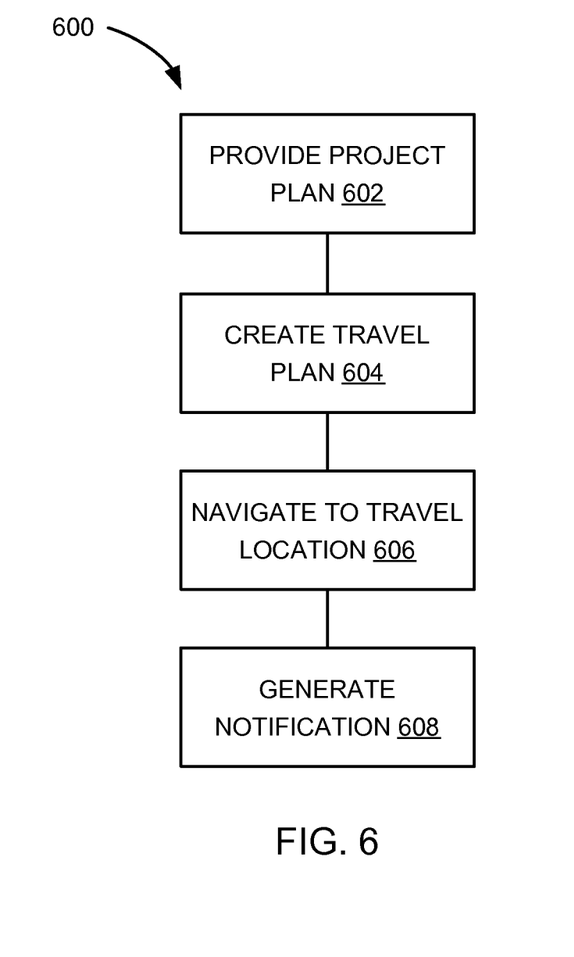
FIG. 6 is a flow chart of a method of operation of a navigation system in a further embodiment of the present invention.

Referring now to FIG. 6, therein is shown a flow chart of a method 600 of operation of a navigation system in a further embodiment of the present invention. The method 600 includes: providing a project plan in a block 602; creating a travel plan having a travel location based on the project plan in a block 604; navigating to the travel location in a block 606; and generating a notification at the travel location for displaying on a device in a block 608.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hitherto fore set forth herein or shown in the accompanying drawings are to be interpreted in an illustrative and non-limiting sense.

What is claimed is:

1. A method of operation of a navigation system comprising:
    providing a project plan;
    extracting contextual information including contact information related to a resource name assigned in the project plan and preparation information about what to plan before a task is performed at a specified time at a travel location from an email, a document, a message, a file, a website, or a combination thereof;

creating a travel plan having the travel location with a control unit based on the project plan;
navigating to the travel location;
determining a task status based on the travel location; and
generating a notification, including the contextual information, at the travel location specified in the project plan including the task status for displaying on a device.

2. The method as claimed in claim 1 further comprising collecting the contextual information related to the project plan, the travel plan, or a combination thereof.

3. The method as claimed in claim 1 further comprising selecting a share level for the project plan.

4. The method as claimed in claim 1 further comprising recording the task status for the project plan at the travel location.

5. The method as claimed in claim 1 wherein generating the notification includes displaying accommodation information at the travel location.

6. A method of operation of a navigation system comprising:
providing a project plan having a task;
extracting contextual information including contact information related to a resource name assigned in the project plan and preparation information about what to plan before a task is performed at a specified time at a travel location from an email, a document, a message, a file, a website, or a combination thereof;
creating a travel plan having the travel location with a control unit based on the project plan;
navigating to the travel location for the task;
determining a task status based on the travel location; and
generating a notification, including the contextual information, at the travel location specified in the project plan including the task status for displaying on a device.

7. The method as claimed in claim 6 further comprising selecting a reminder for the task.

8. The method as claimed in claim 6 further comprising:
recording the task status at the travel location; and
updating the project plan with the task status.

9. The method as claimed in claim 6 further comprising sending the project plan for communicating from a first device to a second device.

10. The method as claimed in claim 6 wherein displaying the notification includes displaying transportation information at the travel location.

11. A navigation system comprising:
a storage unit for providing a project plan, the project plan stored and accessed in the storage unit;
a control unit, coupled to the storage unit, for:
extracting contextual information including contact information related to a resource name assigned in the project plan and preparation information about what to plan before a task is performed at a specified time at a travel location from an email, a document, a message, a file, a website, or a combination thereof,
creating a travel plan having the travel location based on the project plan,
a location unit, coupled to the control unit, for navigating to the travel location; and
a user interface, coupled to the location unit, for generating a notification, including the contextual information, at the travel location specified in the project plan including a task status determined based on the travel location for displaying the on a device.

12. The system as claimed in claim 11 wherein the control unit is for collecting the contextual information related to the project plan, the travel plan, or a combination thereof.

13. The system as claimed in claim 11 wherein the user interface is for selecting a share level for the project plan.

14. The system as claimed in claim 11 wherein the user interface is for recording the task status for the project plan at the travel location.

15. The system as claimed in claim 11 wherein the user interface is for displaying accommodation information at the travel location.

16. The system as claimed in claim 11 wherein:
the storage unit is for providing the project plan having the task;
the location unit is for navigating to the travel location for the task;
the control unit is for executing the task at the travel location; and
the user interface is for generating the notification for the task at the travel location.

17. The system as claimed in claim 16 wherein the user interface is for selecting a reminder for the task.

18. The system as claimed in claim 16 wherein:
the user interface is for recording the task status at the travel location; and
the control unit is for updating the project plan with the task status.

19. The system as claimed in claim 16 further comprising a second communication unit, coupled to the control unit, for sending the project plan from a first device to a second device.

20. The system as claimed in claim 16 wherein the user interface is for displaying transportation information at the travel location.

* * * * *